United States Patent [19]

Humlong

[11] 4,269,336
[45] May 26, 1981

[54] MOUNTING MEANS FOR BICYCLE BASKETS

[75] Inventor: Robert F. Humlong, Maysville, Ky.

[73] Assignee: Wald Manufacturing Co., Inc., Maysville, Ky.

[21] Appl. No.: 10,673

[22] Filed: Feb. 9, 1979

[51] Int. Cl.³ .............................................. B62J 7/06
[52] U.S. Cl. .................................... 224/36; 224/30 A
[58] Field of Search .................. 224/36, 35, 30 A, 39, 224/41, 32; 248/311.1 R

[56] References Cited

U.S. PATENT DOCUMENTS

| | | | |
|---|---|---|---|
| 2,079,851 | 5/1937 | Glenny | 224/36 |
| 2,541,640 | 2/1951 | Dennis | 224/36 |
| 3,140,025 | 7/1964 | Persons | 224/36 |
| 3,606,110 | 9/1971 | Pawsot | 224/36 |
| 3,613,970 | 10/1971 | Humlong | 224/36 |

Primary Examiner—Robert J. Spar
Assistant Examiner—Kenneth Noland
Attorney, Agent, or Firm—Wood, Herron & Evans

[57] ABSTRACT

Devices are provided for securely supporting a wire bicycle basket from a "high rise" handlebar utilizing two pairs of hook-shaped clamps one pair of which is utilized to secure the rear portion of the top frame of the basket to the "risers" of the handlebar, and wherein the other pair of hook-shaped clamps is utilized to anchor a pair of the upstanding rear legs of the U-shaped webs which collectively define the front, rear, and a portion of the bottom walls of the basket to the horizontal branches of the handlebar.

1 Claim, 11 Drawing Figures

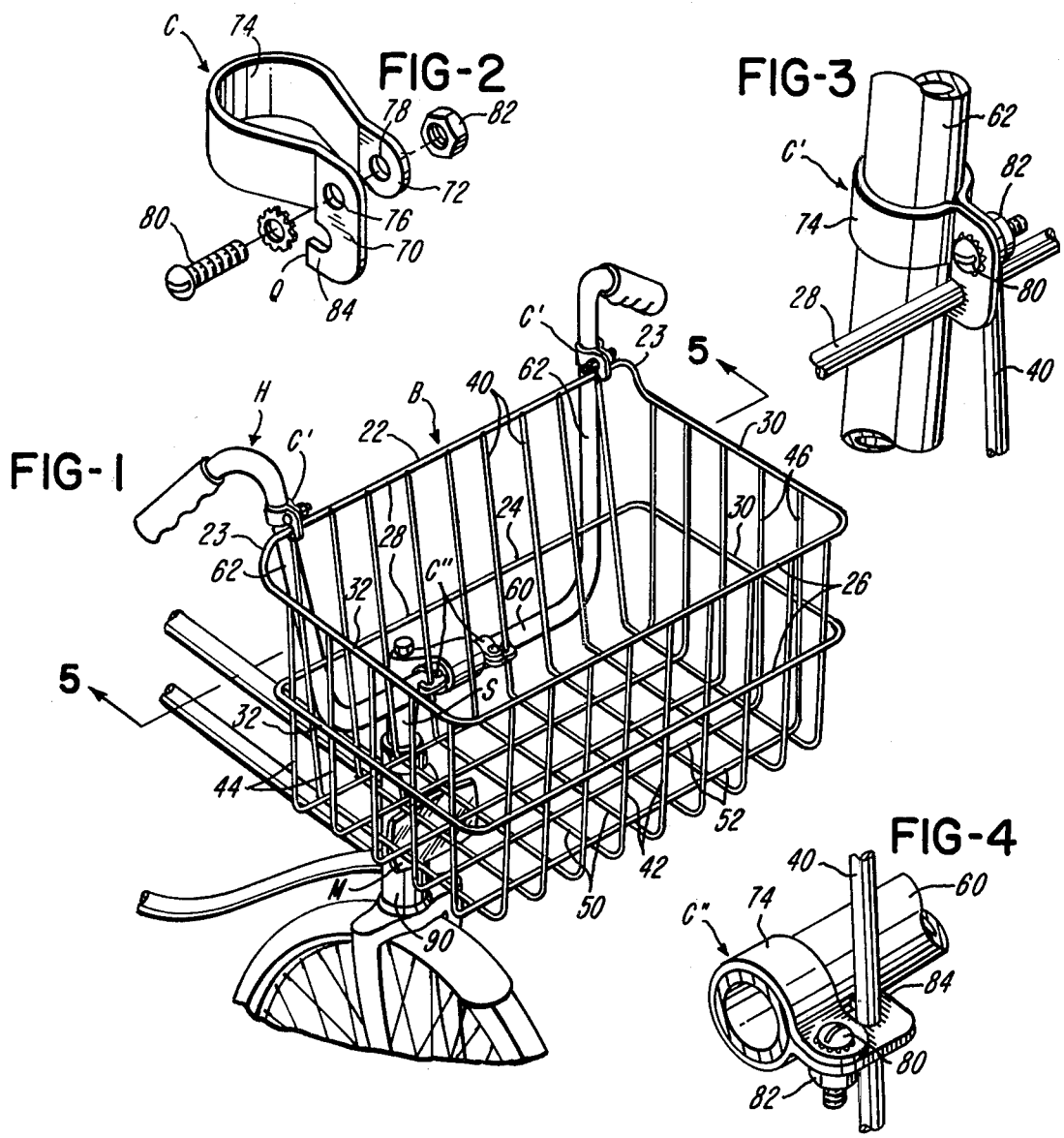
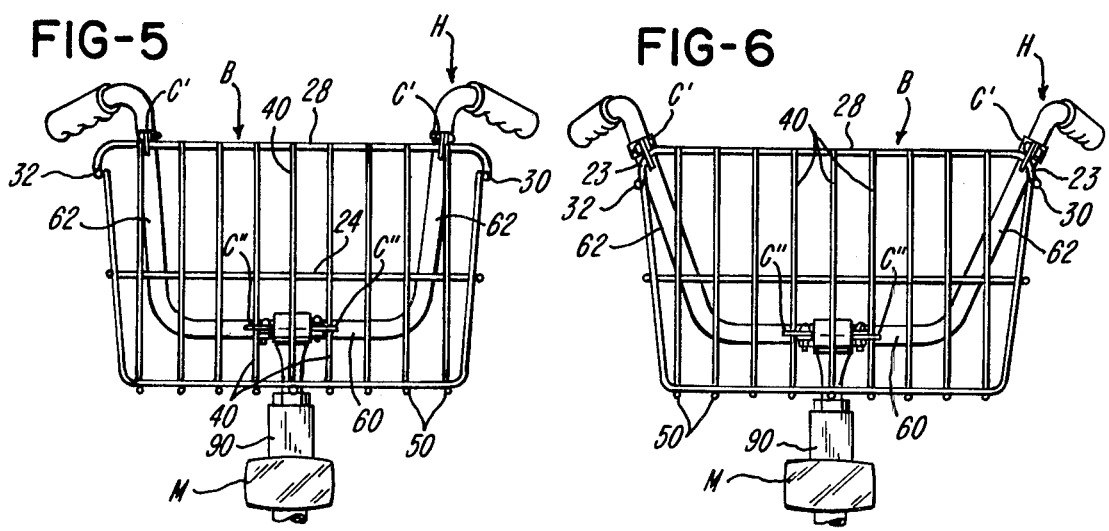

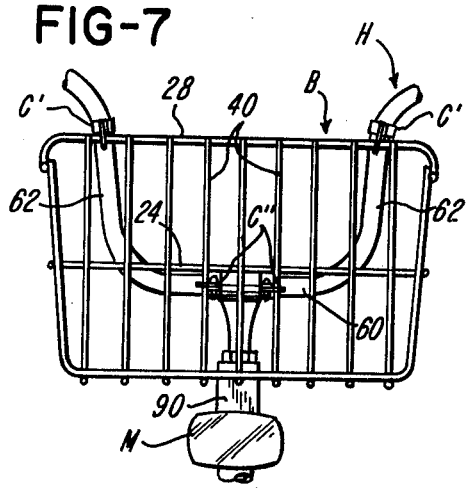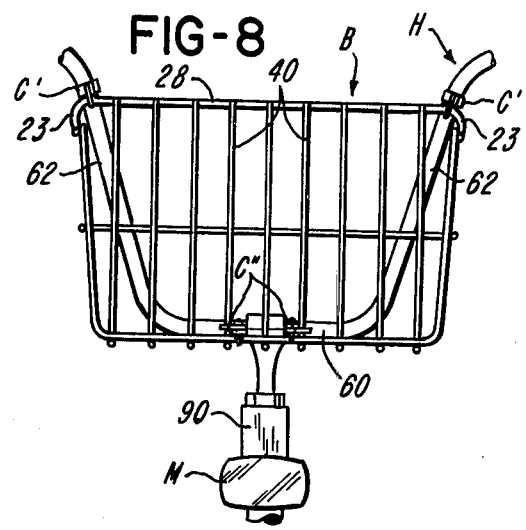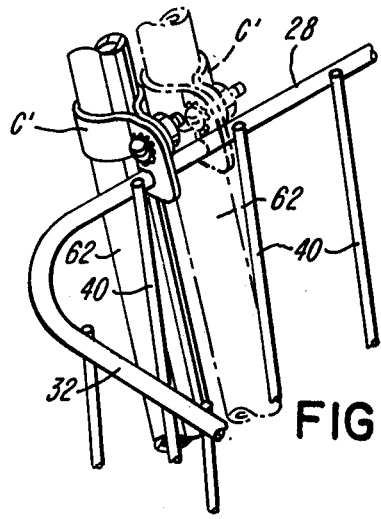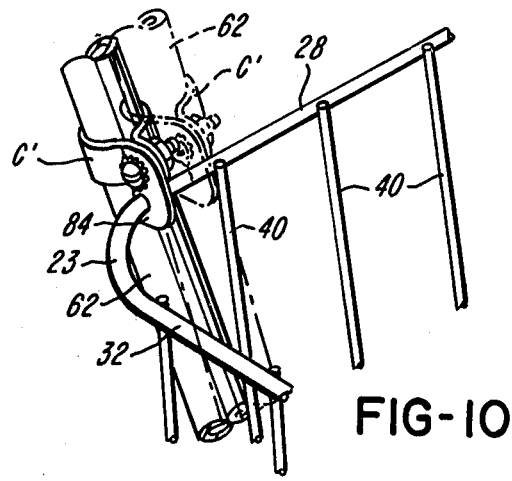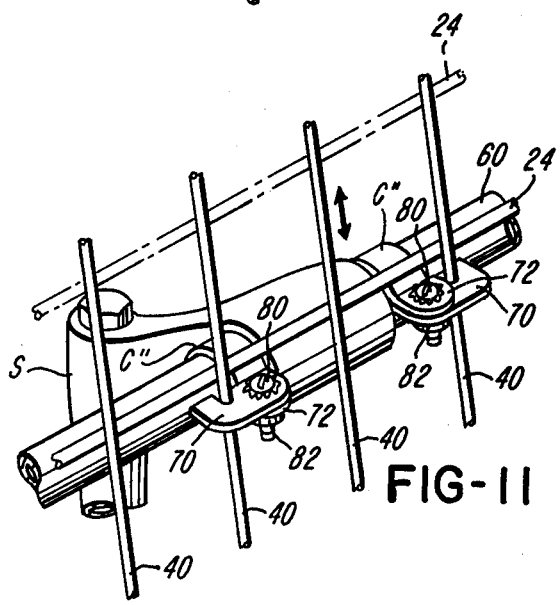

MOUNTING MEANS FOR BICYCLE BASKETS

BACKGROUND OF THE INVENTION

1. Field of the Invention

The field of the invention relates to load carrying baskets for bicycles and the like which are adapted to be securely though releasably anchored to the "high rise" handlebar of a bicycle.

2. Description of the Prior Art

My U.S. Pat. No. 3,613,970 discloses means for mounting wire bicycle baskets to the "high rise" handlebar of a bicycle by means of a pair of hook-like clamps which anchor the rear portion of the top frame of the basket to the handlebar risers, and wherein the rear portion of the center frame of a basket is secured to the horizontal branches of the handlebar by means of elongate, vertically disposed hangers the upper ends of which are looped over and secured to the said horizontal branches of the handlebar, and wherein the lower ends of the hangers are provided with a closed loop or hook which securely engages and suspensibly supports the rear portion of the center frame of the basket. Vertical adjustment of the basket relative to the handlebar is precluded by reason of the fixed length of the hangers.

U.S. Pat No. 3,606,110 of C. P. Pawsat discloses means for mounting a wire bicycle basket relative to a "high rise" handlebar by means of a pair of clamps which securely anchor adjacent pairs of the upstanding side legs of the U-shaped webs which collectively define the side walls of the bicycle basket to the risers of the bicycle handlebar, for thereby securely anchoring the basket relative to the handlebar and wherein the lower wall or bottom portion of the basket, per se, is disposed in overlying, contacting relationship with the horizontal branches of the handlebar. The upstanding side walls and bottom portions of the wire basket of this patent are provided with openings dimensioned to accommodate the riser of the handlebar, whereby the rear portion of the rear wall and bottom of the basket project rearwardly of the horizontal branches of the handlebar on which the basket is literally supported.

It is believed that each of the two aforesaid patents, both of which are assigned to the assignee of the present application, represent the most relevant prior art.

SUMMARY OF THE INVENTION

The invention relates to simple yet highly effective means for securely though releasably anchoring a wire bicycle basket to "high rise" bicycle handlebars wherein the mounting means, per se, provide maximum flexibility for accommodating baskets of varying widths and which will accommodate high rise bicycle handlebars the risers of which are spaced apart by different dimensions. The invention further facilitates the mounting of baskets of different depths relative to the horizontal branches of a handlebar and/or mounting a given basket whereby the bottom thereof is mounted at or below the plane of the horizontal branches of the handlebar thereby providing maximum flexibility of the mounting means.

DESCRIPTION OF THE DRAWINGS

FIG. 1 is a fragmentary perspective view of the front portion of a bicycle showing one exemplary embodiment of a basket and the clamping means therefor which embodies the teachings of the present invention.

FIG. 2 is an exploded perspective view of a hook-shaped clamp of FIG. 1 drawn to a larger scale.

FIG. 3 is an enlarged fragmentary perspective view of a portion of FIG. 1 showing the upper clamping means by which the basket is anchored relative to a "riser" of the handlebar.

FIG. 4 is an enlarged fragmentary view of a portion of FIG. 1 illustrating the clamping means by which the basket is secured to the horizontal branch portion of the handlebar.

FIG. 5 is a fragmentary sectional view of the bicycle basket of FIG. 1 taken on line 5—5 of FIG. 1.

FIGS 6, 7, and 8 are fragmentary sectional views similar to FIG. 5 showing baskets secured to handlebars of differing configurations and whereby the clamping means facilitate suspension of the basket from the handlebar at a location above the reflector means.

FIG. 9 is a fragmentary perspective view showing in greater detail the upper clamping means of FIGS. 5 and 7 illustrating the "lateral" adjustment which is attainable between the risers and the top frame of the rear wall of a basket.

FIG. 10 is a view similar to FIG. 9 illustrating the manner in which the clamping means is adapted to engage various portions of the transition portion of the top frame of the basket between its rear and side edges as in FIGS. 6 and 8.

FIG. 11 is a fragmentary view of the lower clamping means of FIGS. 1, 5, 6, 7, and 8 illustrating the manner in which the lower pair of hook-shaped clamps is adapted to engage an upstanding rear leg of a U-shaped web of the basket whereby to attain the desired vertical adjustment to accommodate various heights of handlebars and/or baskets.

DESCRIPTION OF THE PREFERRED EMBODIMENT

A typical wire bicycle basket has been designated by the letter B wherein the basket comprises a continuous circumferential top frame 22 and a substantially horizontal center frame 24 which, as illustrated, are disposed in spaced relationship and which define the front, rear, and side edges 26, 28, 30, and 32, respectively, of the basket. The numeral 23 designates what may be referred to as a transitional portion of the top frame between the rear and side edges thereof.

A plurality of U-shaped webs are secured to and carried by top frame 22 and center frame 24 wherein the upstanding portions 40 and 42 of a first set of webs define the upstanding rear and front walls respectively of the basket and wherein upstanding legs 44 and 46 of a second set of webs define the upstanding side walls of the basket and wherein bottom legs 50 of said first set and legs 52 of the said second set, collectively define the bottom wall of the basket wherein legs 52 are disposed transversely or at right angles to legs 50.

Upstanding legs 40 and 42 of the first set of U-shaped webs and upstanding legs 44 and 46 of the second set of U-shaped webs are permanently anchored to the top and center frames 22 and 24 by means of welding or the like whereby to provide a sturdy, unitary basket.

The numeral 60 designates the horizontal portions or branches of a high rise handlebar H whereas the numerals 62 designate risers which extend upwardly and outwardly from the horizontal branches 60. The horizontal branches and the upstanding risers of the handlebar are disposed in a single or common plane.

The invention is neither directed to nor concerned with the particular manner in which the center portion of a handlebar is secured to the handlebar stem S.

With particular reference to FIG. 2 the letter C designates generally a hook-like clamp which, for all practical purposes, is similar to, if not identical with, the clamp illustrated in FIG. 2 of my U.S. Pat. No. 3,613,970. Said clamp comprises a metallic ribbon or strip having terminal ends 70 and 72 and an intermediate portion 74 curved to form a band dimensioned to securely though releasably embrace branches 60 or risers 62 of handlebar H. The terminal ends 70 and 72 are suitably apertured as at 76 and 78 whereby to receive a clamping screw 80 having a nut 82 to draw the clamp ends together about the branches or risers of the handlebar so as to effect a firm mounting or anchoring of the clamp to the handlebar.

One end of the clamp ends, such as by way of example 70, is developed whereby to provide an integral hook 84 which opens inwardly, that is, toward the axis of band 74, wherein the hooks of one pair are dimensioned to snugly receive the rear leg 28 of the top frame 22 of a basket, whereas the hooks of the other pair are dimensioned to snugly receive an upstanding leg 40 of the rear-wall-defining first set of U-shaped webs.

With particular reference now to FIG. 3 it will be noted that the clamp band 74 of the upper pair of clamps C' has been secured in circumscribing relationship to the upstanding riser 62 of the handlebar of FIG. 1 whereby the rear leg 28 of the top frame 22 of the basket is received within hook 84 in such a manner as to positively preclude disengagement of the top frame from the hook, it being noted that terminal end Q of the hook is disposed in closely spaced or near-contacting relationship with an adjacent surface of riser 62 during those periods of time when bolt 80 has been fully tightened as in FIGS. 1 and 3.

FIG. 4 illustrates the manner in which band 74 of the lower pair of clamps C" engages the horizontal branch 60 of the handlebar of FIG. 1 whereby an upstanding rear leg 40 of one of the first set of U-shaped webs is engaged and securely anchored relative to branch 60 of the handlebar upon tightening of bolt 80.

The inherent versatility of the subject invention is illustrated by reference to FIGS. 5 through 8.

In FIG. 5 the lateral spacing of risers 62 of the handlebar is such that the upper clamps C' which engage the rear leg 28 of the top frame of the basket are spaced inwardly from the side walls 30 and 32 of the basket and wherein the lower clamps C" which engage the upstanding rear legs 40 of the first set of U-shaped webs are disposed approximately midway between the center frame 24 and the bottom of the basket.

FIG. 6 illustrates the manner in which the basket of FIG. 5 may be associated with a different handlebar wherein risers 62 diverge upwardly and outwardly to such an extent that the upper clamps C' engage the transitional portions 23 of the rear leg of the top frame whereas the lower clamps C" engage branches 60 of the handlebar substantially as illustrated in FIG. 5.

In FIG. 7 the lower clamps C" which are carried by the horizontal branches 60 of the handlebar engage rear legs 40 of the first set of U-shaped webs closely adjacent the center frame 24 of the basket, whereas in FIG. 8 the lower clamps C" engage the rear legs 40 of the first set of U-shaped webs at a location adjacent the bottom wall of the basket below and remote from the center frame 24.

In FIG. 9 the manner in which the riser-supported upper clamps C' may be adjusted along the rear leg 28 of the top frame of a basket has been illustrated in solid and broken outlines, it being understood that the hook portions of clamps C' engage rear leg 28 of the top frame at locations between adjacent rear legs 40 of the first set of the U-shaped webs as determined by the lateral spacing of the risers 62.

The disclosure of FIG. 10 is similar to that of FIG. 9 and graphically illustrates the manner in which the hooks 84 of the upper clamps C' which are secured to and carried by risers 62 of a handlebar are adapted to engage various portions of the transition portion 23 of the top frame of the wire basket.

FIG. 11 illustrates the manner in which the lower clamps C" which are secured to and carried by the horizontal branches 60 of a handlebar are adapted to accommodate vertical adjustment relative to the rear legs 40 of the first set of U-shaped webs of the basket.

With further reference to FIGS. 1 and 5 through 8 it will be noted that the baskets are adapted to be securely anchored to the horizontal branches 60 and upstanding risers 62 of a high rise handlebar whereby to dispose the bottom of the basket free of engagement with any portion of the handlebar and in a plane which is disposed above and therefore out of interfering relationship with a reflective mirror M which may be secured by any suitable means to housing 90 of the bicycle frame.

It will be noted that when it is desirable that the heads of bolts 80 be accessible from the same side of the horizontal branches 60 or risers 62 of each of the upper and lower clamps which collectively define a pair C' or C", the bolt head will, as best illustrated in FIG. 11, be disposed over terminal end 70 in one instance and over terminal end 72 in the other instance.

From the foregoing it will be noted that in each instance the basket is secured to and engages only the handlebar and that as mounted the center of gravity of the basket is sufficiently low to facilitate steering and balancing of the bicycle in such a manner that the contents of a basket will not interfere with the ability of a rider to steer the cycle.

What is claimed is:

1. A wire basket structure for mounting on a bicycle handlebar having opposed horizontal branch portions and upwardly extending risers, said branch portions and risers being disposed substantially in a single plane, said basket including upper front, rear, and side edges defined by a circumferential top frame, an intermediate portion defined by a circumferential center frame, and two sets of U-shaped webs the upstanding legs of which are fixedly secured to said top and center frames for defining the upstanding front, rear, and side walls of the basket and wherein the lower legs of said webs define the bottom of the basket;

means anchoring the top frame of the basket to each of said handlebar risers in any one of a plurality of different vertical positions of said basket relative to the handlebar risers;

means anchoring portions of the upstanding rear leg of one of said sets of U-shaped webs to the horizontal branch portions of the handlebar in any one of plurality of different vertical positions of said basket relative to said horizontal branch portions of the handlebar;

said first mentioned anchoring means comprising a pair of upper clamps secured to and carried by the handlebar risers and including a projecting hook portion in which the top frame of the basket is received and anchored to and against relative movement with a riser;

said second mentioned anchoring means being substantially identical to said first mentioned anchoring means and comprising a pair of lower clamps secured to and carried by the horizontal branch portions of the handlebar and including a projecting hook portion in which the rear leg of said one of said sets of said upstanding U-shaped webs is received and anchored to and against relative movement with the horizontal branch portions of the handlebar, said hook portion of each of said upper clamps projecting downwardly over, around, and under the top frame of the basket for suspending the basket from said risers of the handlebar, and said hook portion of each of the lower clamps projecting in a substantially horizontal direction over and around an upstanding rear leg of one of said U-shaped webs for anchoring the rear wall of the basket to said horizontal branch portions of said handlebar.

* * * * *